3,470,000
FROZEN MUSHROOM PRODUCT

James F. Hale, Old Greenwich, and Donald K. Tressler, Westport, Conn., assignors to The Borden Company, New York, N.Y., a corporation of New Jersey
No Drawing. Filed Jan. 12, 1966, Ser. No. 520,046
Int. Cl. A23b 7/04; A23l 3/34
U.S. Cl. 99—193                                         3 Claims

ABSTRACT OF THE DISCLOSURE

Preserving mushrooms by treating at ambient temperature with a gas containing an effective amount of gaseous sulfur dioxide for a time sufficient to prevent discoloration of the mushrooms during subsequent freezing, storage, and thawing.

---

During storage, frozen mushrooms treated according to present procedures gradually turn greenish brown or dark brown in color and as such become unsalable. Moreover, upon thawing, a liquid (juice) exudes from the mushroom which is dark, nearly brown, in color, and when such mushrooms are used in the manufacture of creamed products—chicken a la king or any other mushroom dish containing a cream sauce—the sauce is darkened objectionably. Lastly, mushrooms so treated turn dark brown during the preparation and cooking process.

Various procedures are presently used to try to eliminate this objectionable darkening during storage and cooking and exudation of juice, but none has proven satisfactory. One such procedure involves a blanching treatment of the mushroom to inactivate the oxidizing enzymes which are believed to cause the darkening of the mushroom during storage and subsequent cooking. Another involves heating the mushrooms in a solution of citric acid, or mixture of citric and ascorbic acid, or sodium bisulfite. A third procedure comprises a brief blanching treatment followed by cooling the mushrooms in one of the solutions noted above.

The blanching treatment is unsuitable in that there is a considerable loss of weight due to the juice which is removed from the mushrooms by this heating operation. The loss in weight varies from a minimum of 15% to in some cases as much as 35% of the original weight of the mushroom. Further, this blanching or cooking treatment causes the mushrooms to become tough and they cannot be readily tenderized during the ordinary cooking procedure. Lastly, this loss in weight of the mushroom is accompanied by a loss in size of the mushroom, making them appear undesirable to a purchaser.

With respect to the process of heating mushrooms in acidic solutions, while discoloration of the mushrooms is prevented the heat treatment is such that it again results in a weight loss in the mushroom, and toughening of the mushroom, as noted above. Attempts to minimize this heat effect by using a short heat treatment and then cooling the mushrooms in an acidic solution have not been satisfactory, because even this limited heating results in toughening and weight loss.

One procedure that is used, but is commercially unsuitable, is the soaking of the fresh mushrooms without heat treatment in sulfite or meta-bisulfite solutions for extended periods of time. This lengthy time treatment is essential in order to obtain the necessary penetration of the sulfite ion into the interior of the mushroom. The use of sequestering agents such as ethylene diamine tetracetic acid or other substances to shorten this time has been considered, but again has not acted to speed up the penetration into the living tissue within reasonable commercial periods of time.

The instant invention provides frozen mushrooms which do not lose an appreciable weight during preparation and freezing, retain their natural appearance during freezing, subsequent thawing and cooking, do not darken during storage, do not exude an unsightly brown liquid on thawing and do not toughen during freezing, storage and subsequent thawing and cooking. In addition, the present invention results in a method of preparing mushrooms for freezing which can be carried on in a very short period of time.

Briefly stated, the present invention comprises treating mushrooms with an effective amount of gaseous sulfur dioxide for a time sufficient to prevent discoloration of the mushroom during subsequent freezing, storage and thawing and to the resultant product.

The sulfur dioxide that is used is any that is commerically available, and ordinarily used as a gaseous mixture containing from about 8% to about 25% sulfur dioxide by volume. A specific example is an atmosphere containing, by volume, 80% air and 20% $SO_2$.

The time of treatment with $SO_2$ in order to prevent discoloration will vary dependent upon the percentage of $SO_2$ in the gaseous atmosphere. In an atmosphere containing 10% $SO_2$ by volume, the time may vary from about 15 seconds to a maximum of about 30 minutes. If 20% $SO_2$ by volume is used, the treatment time can vary from about 10 seconds to about 20 minutes. Longer treatment times may result in products which taste and smell strongly of sulfur dioxide. If other percentages of $SO_2$ are to be used, one need only run test batches to determine the minimum and maximum treatment times. With sliced mushrooms it is best not to use an atmosphere containing more than 10% $SO_2$ by volume and to use the treatment times for this percentage of $SO_2$ as set forth above.

The sulfur treatment of the mushrooms may be carried out by placing the mushrooms in a confined space containing an atmosphere of proper $SO_2$ volume for a time based on $SO_2$ content of the atmosphere as noted above. Alternatively, the mushrooms may be placed in a closed container under a slight vacuum, e.g., 3 inches of mercury. The vacuum is then relieved with a gaseous sulfur dioxide or a mixture of sulfur dioxide and air, and the mushrooms exposed to the $SO_2$ for a sufficient period of time. This procedure is very effective in getting small amounts of sulfur dioxide into the interstices of the mushroom, even in freshly harvested "tight" mushrooms which are ordinarily difficult to penetrate.

The unheated sulfur dioxide treated mushrooms are then frozen and kept in storage under frozen conditions until time for their use when they are thawed and cooked. The conditions of freezing are those ordinarily used and the mushrooms can be frozen either before or after being packaged in aluminum, plastic, and the like containers. It is preferred to replace any air in the final package with an inert gas such as nitrogen.

The invention will be further illustrated by description in connection with the following specific examples of the practice of it.

Example 1

400 grams of whole mushrooms at ambient temperature were placed into a container having an atmosphere of 90% by volume air and 10% by volume $SO_2$. After 30 seconds exposure to this atmosphere, the mushrooms were removed from the container and placed in 12-ounce aluminum foil frozen food packages which were then covered.

The mushrooms were frozen on plates maintained at $-15°$ F. in a room at $0°$ F. The mushrooms were thereafter stored at $0°$ F. until time for use.

After one week in storage they were thawed, examined, then cooked and again examined. The loss of liquid, or drip, which occurred during thawing amounted to less than 5% of the weight of the mushrooms and the liquid was light in color. The cooked mushrooms were light in color and had no taste of sulfur dioxide or any other objectionable flavor.

Example 2

The procedure of Example 1 was followed, with the exception that the mushrooms were first sliced into ⅛ inch slices before being placed into the container having an atmosphere of 10% $SO_2$ by volume.

Again, after thawing and cooking, the mushrooms retained their light color and there was little weight loss due to exudation of liquid from the mushrooms.

Example 3

400 grams of whole mushrooms were placed into a container and under a vacuum of 3 inches of mercury. The vacuum was relieved with gaseous $SO_2$ to give an atmosphere of 10% $SO_2$. After 15 seconds in this atmosphere the mushrooms were removed.

They were then packaged and frozen in aluminium containers, stored for a week at 0° F., and tested as described in Example 1. Again, no discoloration of either the juice or the mushrooms was noted, and the mushrooms were substantially as tender as fresh untreated, unfrozen mushrooms.

Example 4

The procedure of Example 3 was followed, with the exception that the treated mushrooms were first frozen, placed in plastic bags, a vacuum drawn on the bags to remove the air, and the vacuum released with nitrogen prior to sealing the bag. No discoloration after extended frozen storage was noted and the mushrooms, when thawed and cooked, were light in color and tender.

Example 5

The procedure of Example 1 is followed, except that separate lots of mushrooms are treated in atmospheres containing, respectively, 8%, 15%, and 20% $SO_2$ by volume. In each case, the end product is comparable in color, texture, and flavor with the product of Example 1.

While the exact theory is not precisely understood, it is believed that the rapid penetration of the gaseous sulfur dioxide into the tissues of the mushroom inactivates the enzyme system which otherwise would cause darkening of the mushrooms during storage, thawing and cooking. This may be the result of a reducing action, a metal sequestration, or an alteration of the chemical composition of the mushroom resulting in a compound which stabilizes the product.

What is claimed is:

1. The method of making storage-stable frozen mushrooms consisting essentially of treating mushrooms at ambient temperature with a gas containing an effective amount of gaseous sulfur dioxide for a time sufficient to prevent discoloration of the mushrooms during subsequent freezing, storage, and thawing, and freezing the mushrooms.

2. The method of making storage-stable frozen mushrooms consisting essentially of treating mushrooms at ambient temperature with a gas containing from about 8% to 25% $SO_2$ by volume for from about 10 seconds to about 30 minutes and then freezing the mushrooms.

3. The method of claim 2, wherein the frozen mushrooms are packaged in an inert atmosphere.

References Cited

UNITED STATES PATENTS

| | | | |
|---|---|---|---|
| 2,848,333 | 8/1958 | Fisher | 99—193 |
| 3,231,395 | 1/1966 | Duggan et al. | 99—193 |

A. LOUIS MONACELL, Primary Examiner

J. M. HUNTER, Assistant Examiner

U.S. Cl. X.R.

99—154, 227